(12) United States Patent
Moss

(10) Patent No.: US 12,157,544 B1
(45) Date of Patent: Dec. 3, 2024

(54) HARD SHELL BOAT COVER

(71) Applicant: Tommy Lee Moss, Gallipolis, OH (US)

(72) Inventor: Tommy Lee Moss, Gallipolis, OH (US)

( * ) Notice: Subject to any disclaimer, the term of this patent is extended or adjusted under 35 U.S.C. 154(b) by 0 days.

(21) Appl. No.: 18/205,600

(22) Filed: Jun. 5, 2023

Related U.S. Application Data

(63) Continuation of application No. 17/133,384, filed on Dec. 23, 2020, now Pat. No. 11,667,360.

(60) Provisional application No. 62/953,397, filed on Dec. 24, 2019.

(51) Int. Cl.
*B63B 59/00* (2006.01)

(52) U.S. Cl.
CPC ................................ *B63B 59/00* (2013.01)

(58) Field of Classification Search
CPC ........................................................ B63B 59/00
USPC ......................................................... 114/361
See application file for complete search history.

(56) References Cited

U.S. PATENT DOCUMENTS

| | | | | |
|---|---|---|---|---|
| 4,741,452 A | * | 5/1988 | Holzkopf | B65D 43/0206 220/783 |
| D331,384 S | * | 12/1992 | Smith | D12/318 |
| 5,809,929 A | * | 9/1998 | Garnes | B63B 17/02 114/364 |
| 5,894,812 A | * | 4/1999 | Dessingue | B63B 17/02 114/364 |
| 5,901,657 A | * | 5/1999 | Schwartz | B63B 17/02 114/361 |
| 6,213,046 B1 | * | 4/2001 | Lawson | B63B 17/02 114/361 |
| 2007/0119743 A1 | * | 5/2007 | Tucker | B65D 21/0222 206/503 |

OTHER PUBLICATIONS

Muskie Discussion Forums, Muskie First Website, Web page <https://muskie.outdoorsfirst.com/board/forums/thread-view.asp?tid=87053&posts=4&highlight=ranger%20hard%20top%20cover&highlightmode=1#M649036>, 3 pages, dated Jun. 27, 2013, retrieved from www.muskie.outdoorsfirst.com on Jun. 11, 2022.

* cited by examiner

*Primary Examiner* — Anthony D Wiest
(74) *Attorney, Agent, or Firm* — The Law Office of Patrick F. O'Reilly III, LLC

(57) ABSTRACT

A hard shell boat cover is disclosed herein. The hard shell boat cover includes a plurality of boat cover sections, the plurality of boat cover sections configured to interlock with one another so as to form the hard shell boat cover, and one or more of the plurality of boat cover sections configured to engage with a top peripheral edge of a boat; and at least one securement element attached to one of the plurality of boat cover sections, the securement element configured to be coupled to a securement strap for securing the hard shell boat cover to the top peripheral edge of the boat.

14 Claims, 10 Drawing Sheets

Detail "A"

Detail "B"

Detail "C"

HARD SHELL BOAT COVER

CROSS-REFERENCE TO RELATED APPLICATIONS

This is a continuation of U.S. Nonprovisional patent application Ser. No. 17/133,384, entitled "Hard Shell Boat Cover", filed on Dec. 23, 2020, and further claims the benefit of U.S. Provisional Patent Application No. 62/953,397, entitled "Hard Shell Boat Cover", filed on Dec. 24, 2019, the disclosures of each of which are hereby incorporated by reference as if set forth in their entireties herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a hard shell boat cover. More particularly, the invention relates to a hard shell boat cover that comprises a plurality of interlocking boat cover sections.

2. Background

Conventional fabric boat covers are known that are configured to cover the top of a boat while the boat is being transported and stored. However, these conventional fabric boat covers have numerous limitations and drawbacks. First of all, these conventional fabric boat covers tend to sag when rain, ice, or snow accumulates on the top of the cover. Then, once the rain, ice, or snow accumulates on the top of the cover, the fabric boat covers are susceptible to leaking. Secondly, while the boat is being is being transported, these conventional fabric boat covers tend to flap in the wind, thus creating significant drag during the transportation of the boat. Thirdly, conventional fabric boat covers offer little protection from flying objects, which could hit and damage the inside of the boat. Finally, conventional fabric boat covers typically do not lock in place on the boat, thus making it easy for someone to gain access to the interior of the boat, and possibly vandalize the inside of the boat or steal an item from the interior of the boat.

Therefore, what is needed is a hard shell boat cover that does not sag under the weight of rain, ice, or snow. Moreover, a hard shell boat cover is needed that is aerodynamic so that the boat cover does not flap in the wind or create excessive drag when the boat is being towed. Furthermore, there is a need for a hard shell boat cover that provides more protection for the boat and the contents inside the boat by locking down on the top of the boat.

BRIEF SUMMARY OF EMBODIMENTS OF THE INVENTION

Accordingly, the present invention is directed to a hard shell boat cover that substantially obviates one or more problems resulting from the limitations and deficiencies of the related art.

In accordance with one or more embodiments of the present invention, there is provided a hard shell boat cover that includes a plurality of boat cover sections, the plurality of boat cover sections configured to interlock with one another so as to form the hard shell boat cover, and one or more of the plurality of boat cover sections configured to engage with a top peripheral edge of a boat; and at least one securement element attached to one of the plurality of boat cover sections, the securement element configured to be coupled to a securement strap for securing the hard shell boat cover to the top peripheral edge of the boat.

In a further embodiment of the present invention, each of the plurality of boat cover sections is made from a generally rigid polymeric material or plastic.

In yet a further embodiment, at least one of the plurality of boat cover sections comprises a formed enclosure for accommodating a trolling motor of the boat.

In still a further embodiment, at least one of the plurality of boat cover sections comprises a notched portion for accommodating a main motor of the boat.

In yet a further embodiment, the top peripheral edge of the boat comprises a peripheral bumper, and at least one of the plurality of boat cover sections comprises a curved side rim for engaging with the peripheral bumper at the top peripheral edge of the boat.

In still a further embodiment, the at least one securement element comprises a strap tie-down eyelet, the strap tie-down eyelet including an aperture for receiving a hook member of the securement strap.

In yet a further embodiment, at least a first one of the plurality of boat cover sections comprises one or more notches proximate to a front edge or rear edge of the first one of the plurality of boat cover sections, at least a second one of the plurality of boat cover sections comprises one or more protruding ridges configured to engage with the one or more notches of the first one of the plurality of boat cover sections so that the first and second ones of the plurality of boat cover sections are able to interlock with one another.

In still a further embodiment, the hard shell boat cover further comprises at least one vertical support post for supporting a center portion of the hard shell boat cover.

In yet a further embodiment, the at least one vertical support post comprises a plurality of vertical support posts, and the hard shell boat cover further comprises a horizontal support bar spanning the plurality of vertical support posts, the horizontal support bar supporting the center portion of the hard shell boat cover.

In still a further embodiment, the plurality of boat cover sections are configured to be stacked on a boat trailer when the plurality of boat cover sections are not being used on the boat.

In yet a further embodiment, each of the plurality of boat cover sections comprises an aperture formed therein for accommodating a post on the boat trailer so that the plurality of boat cover sections are able to be arranged in a stacked configuration on the post of the boat trailer when the plurality of boat cover sections are not being used on the boat.

In still a further embodiment, each of the plurality of boat cover sections comprises a plug for sealing the aperture when the plurality of boat cover sections are being used to cover the boat so that hard shell boat cover is generally waterproof.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
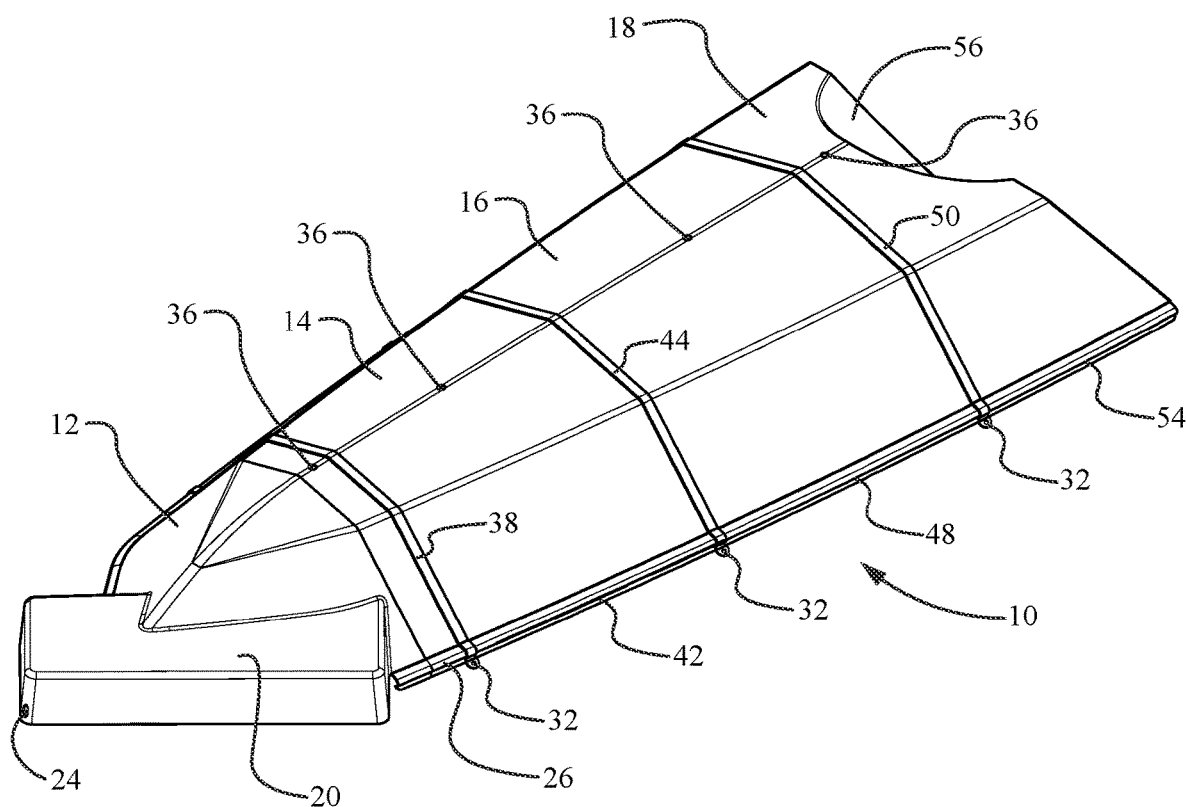
FIG. 1 is a top-side perspective view of a hard shell boat cover in its assembled state, according to an illustrative embodiment of the invention.
Figure 2:
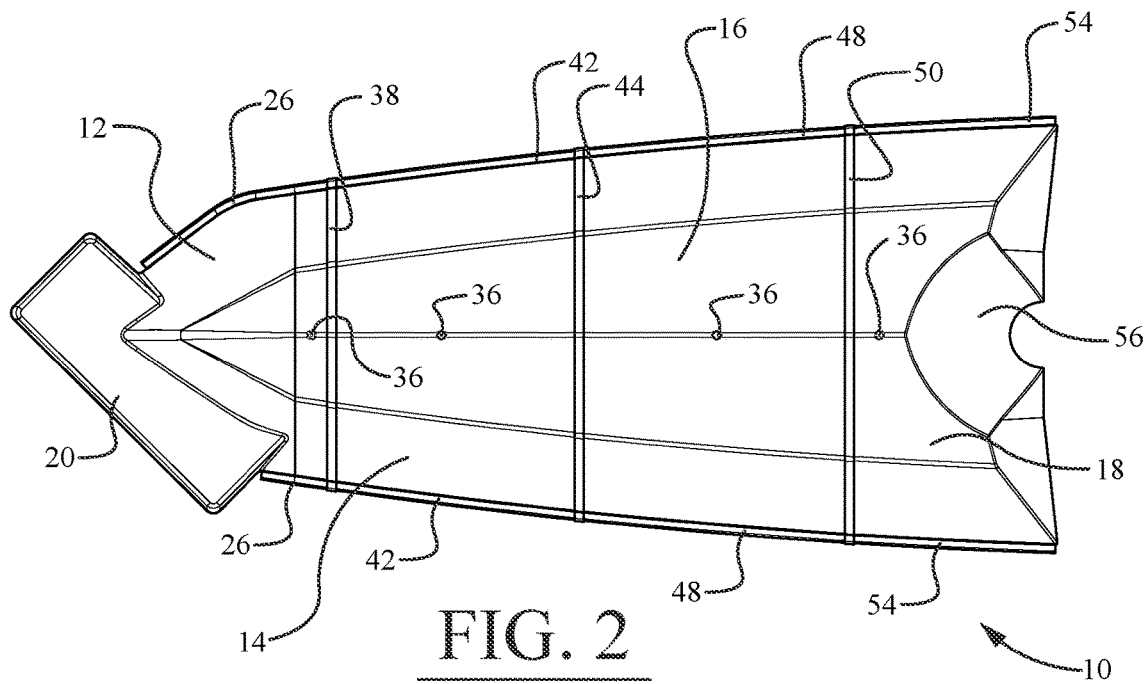
FIG. 2 is a top plan view of the hard shell boat cover of FIG. 1.
Figure 3:
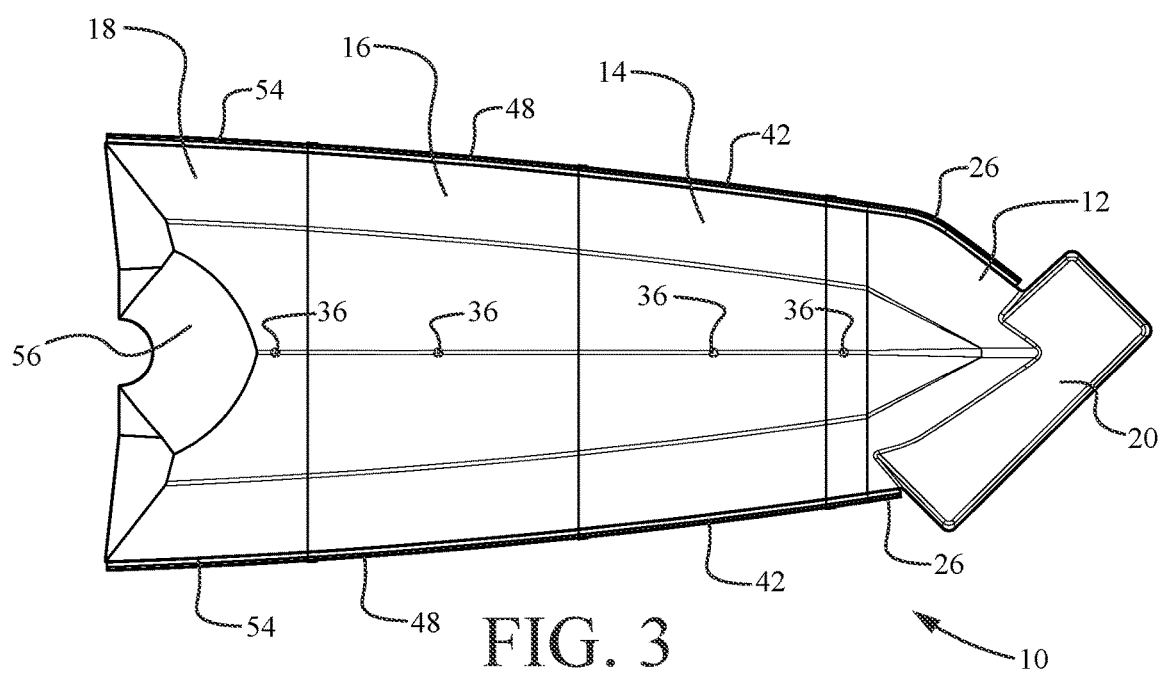
FIG. 3 is a bottom plan view of the hard shell boat cover of FIG. 1.

An illustrative embodiment of a hard shell boat cover is seen generally at 10 in FIGS. 1-10. With initial reference to FIGS. 1 and 8, it can be seen that the hard shell boat cover 10 generally comprises a plurality of boat cover sections 12, 14, 16, 18, the plurality of boat cover sections 12, 14, 16, 18 configured to interlock with one another so as to form the hard shell boat cover 10, and one or more of the plurality of boat cover sections 12, 14, 16, 18 configured to engage with a top peripheral edge 70 of a boat 64 (see FIG. 9); and a plurality of securement elements 32 attached to the plurality of boat cover sections 12, 14, 16, 18, the securement elements 32 configured to be coupled to securement straps 84, 86 for securing the hard shell boat cover 10 to the top peripheral edge 70 of the boat 64 (see FIG. 10).

Figure 8:
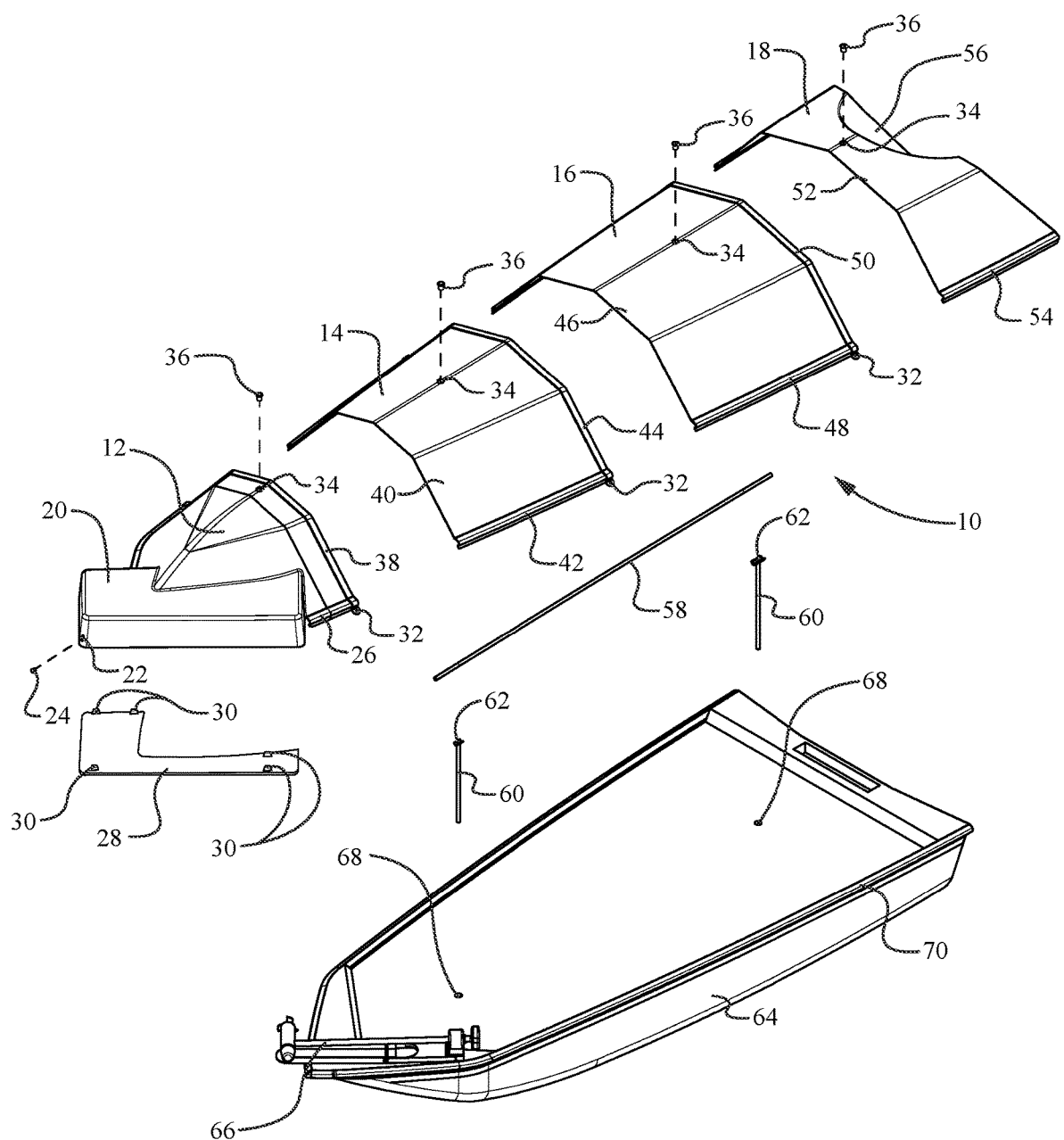
FIG. 8 is an exploded perspective view of the hard shell boat cover of FIG. 1 illustrated together with a boat.

Referring to the exploded perspective view of FIG. 8, it can be seen that, in the illustrative embodiment, the hard shell boat cover 10 comprises a first boat cover section 12 disposed at the front of the boat 64, a second boat cover section 14 disposed at the forward middle portion of the boat 64, a third boat cover section 16 disposed at the rearward middle portion of the boat 64, and a fourth boat cover section 18 disposed at the rear of the boat 64. Also, in the illustrative embodiment, each of the plurality of boat cover sections 12, 14, 16, 18 is made from a generally rigid polymeric material or plastic that generally maintains its shape when wind forces act thereon.

In alternative embodiments, the hard shell boat cover 10 may comprise a different number of boat cover sections (e.g., three (3) boat cover sections or five (5) boat cover sections), and the hard shell boat cover 10 may be formed from different suitable materials.

With reference again to FIGS. 1 and 8, in the illustrative embodiment, the first boat cover section 12 of the hard shell boat cover 10 comprises a formed enclosure 20 for accommodating a trolling motor 66 of the boat 64. As shown in FIGS. 8 and 11, the bottom portion of the trolling motor 66 is covered by the bottom cover panel 28. The bottom cover panel 28 is provided with a plurality of protrusions 30 for engaging with the bottom edge of the formed enclosure 20 so as to enclose the trolling motor 66 (refer to FIGS. 8 and 11). Also, as shown in FIGS. 1 and 8, the front corner of trolling motor enclosure 20 comprises an eyelet aperture 22 for receiving a hook member of the securement strap 84 (see FIGS. 10 and 11). As shown in Detail "A" of FIG. 11, the securement strap 84 secures the trolling motor enclosure 20 of the hard shell boat cover 10 to the boat 64 so as to ensure that the cover 10 remains engaged with the boat 64 during the transportation of the boat 64 from place to place.

As shown in the illustrative embodiment of FIG. 8, the trolling motor enclosure 20 comprises a plug 24 for sealing the eyelet aperture 22 when the plurality of boat cover sections 12, 14, 16, 18 are being used to cover the boat 64 so that hard shell boat cover 10 is generally waterproof (i.e., the plug 24 prevents water from getting in the cover 10). In the illustrative embodiment, the plug 24 may comprise a suitable rubber or polymeric plug that snugly fits within the eyelet aperture 22.

Figure 16:
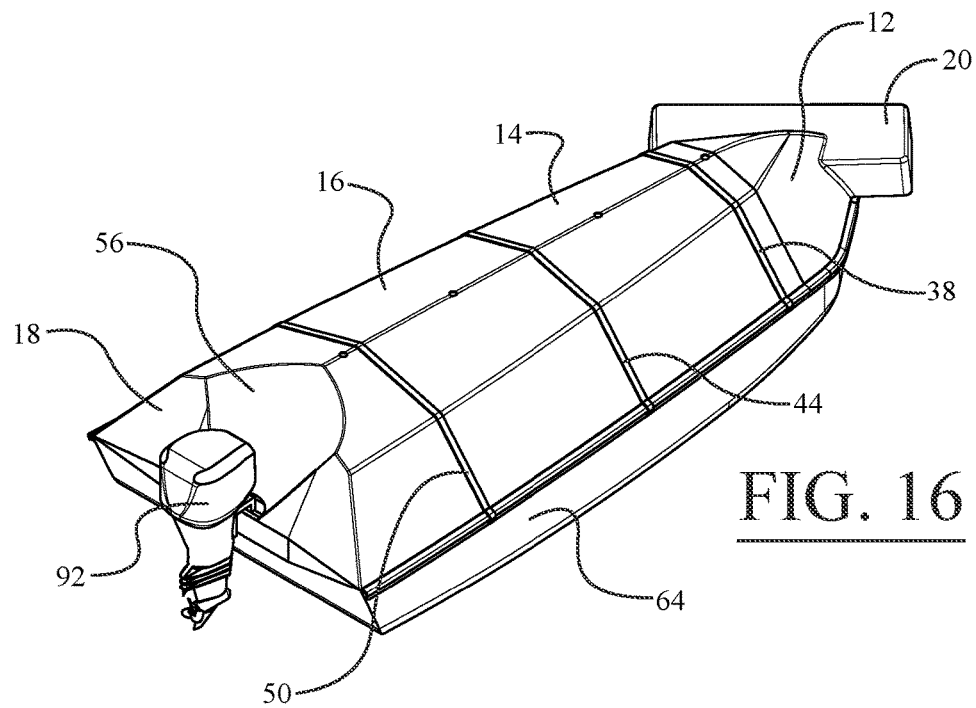
FIG. 16 is a rear-top perspective view of the hard shell boat cover of FIG. 1 shown disposed on the top of the boat.

In the illustrative embodiment, the fourth boat cover section 18 of the hard shell boat cover 10 comprises a notched portion 56 for accommodating a main motor 92 of the boat 64 (refer to FIGS. 1, 8, and 16). As shown in these figures, the notched portion 56 of the hard shell boat cover 10 may comprise a concave notch formed in the fourth boat cover section 18. In FIG. 16, it can been seen that the motor 92 clears the concave notch 56 of the boat cover 10.

Figure 9:
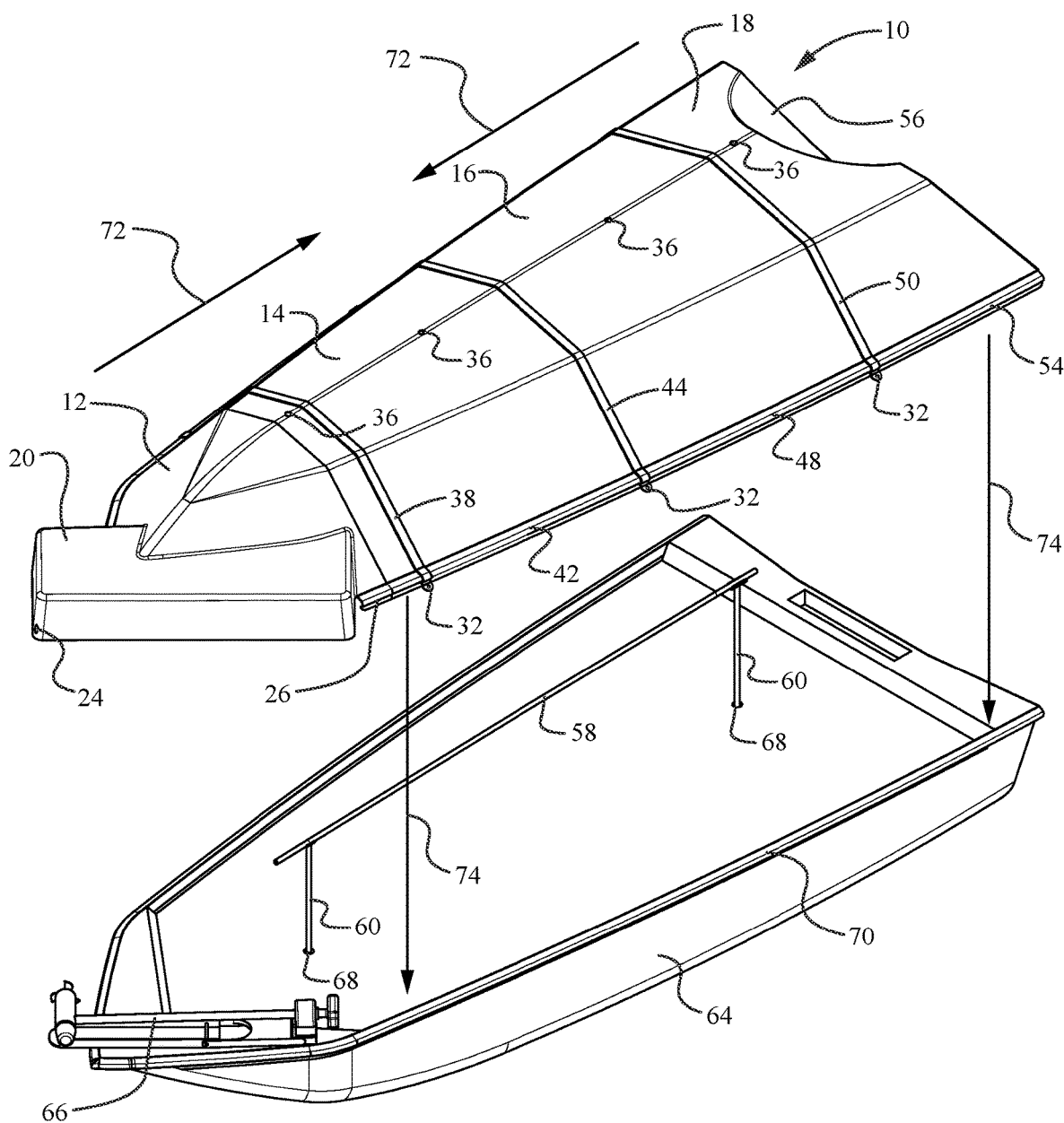
FIG. 9 is another perspective view of the hard shell boat cover of FIG. 1 illustrated together with a boat, wherein the manner in which the boat cover is assembled together and the manner in which the boat cover is fitted on the boat is illustrated.
Figure 12:
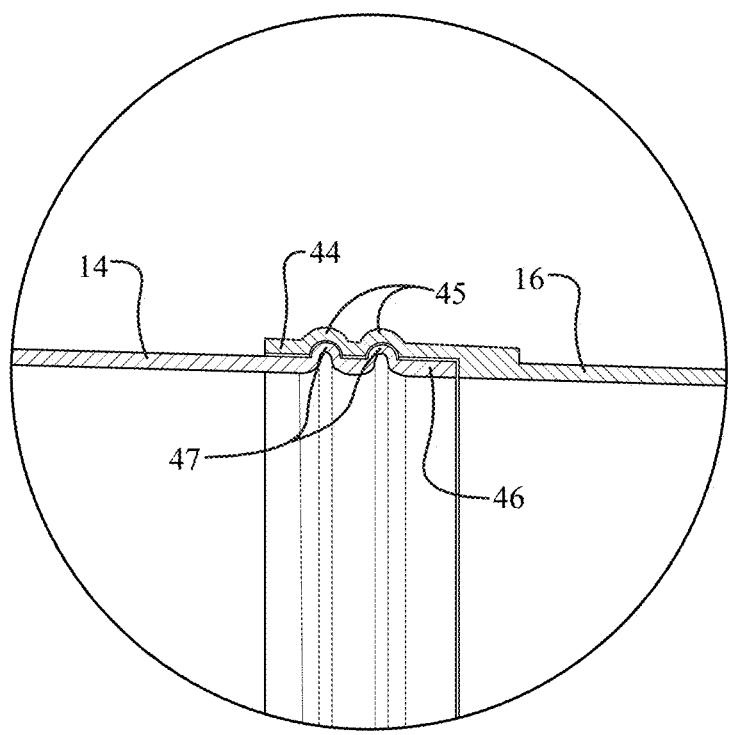
FIG. 12 is an enlarged cross-sectional view illustrating the overlapping seam between two of the boat cover sections of the hard shell boat cover depicted in FIG. 10 (Detail "B")

Now, referring to FIGS. 1, 8, and 12 of the illustrative embodiment, the manner in which the plurality of boat cover sections 12, 14, 16, 18 are configured to interlock with one another will be described. As shown in the exploded view of FIG. 8, the first boat cover section 12 comprises a rear overlapping lip 38 that overlaps with a front edge 40 of the second boat cover section 14. Similarly, the second boat cover section 14 comprises a rear overlapping lip 44 that overlaps with a front edge 46 of the third boat cover section 16, and the third boat cover section 16 comprises a rear overlapping lip 50 that overlaps with a front edge 52 of the fourth boat cover section 18. In the illustrative embodiment, the rear overlapping lip 38 of the first boat cover section 12, the rear overlapping lip 44 of the second boat cover section 14, and the rear overlapping lip 50 of the third boat cover section 16 comprise a pair of notched areas 45 that engage with a pair of corresponding protruding ridges 47 of the second boat cover section 14, the third boat cover section 16, and the fourth boat cover section 18, respectively (refer to Detail "B" in FIG. 12). The engagement between the pair of notched areas 45 of the overlapping lips 38, 44, 50 of boat cover sections 12, 14, 16 and the pair of corresponding protruding ridges 47 of the front edges 40, 46, 52 of respective boat cover sections 14, 16, 18 produces the interlocking engagement between the boat cover sections 12, 14, 16, 18. In FIG. 9, the interlocking engagement between the boat cover sections 12, 14, 16, 18 is diagrammatically represented by the opposing arrows 72.

Figure 13:
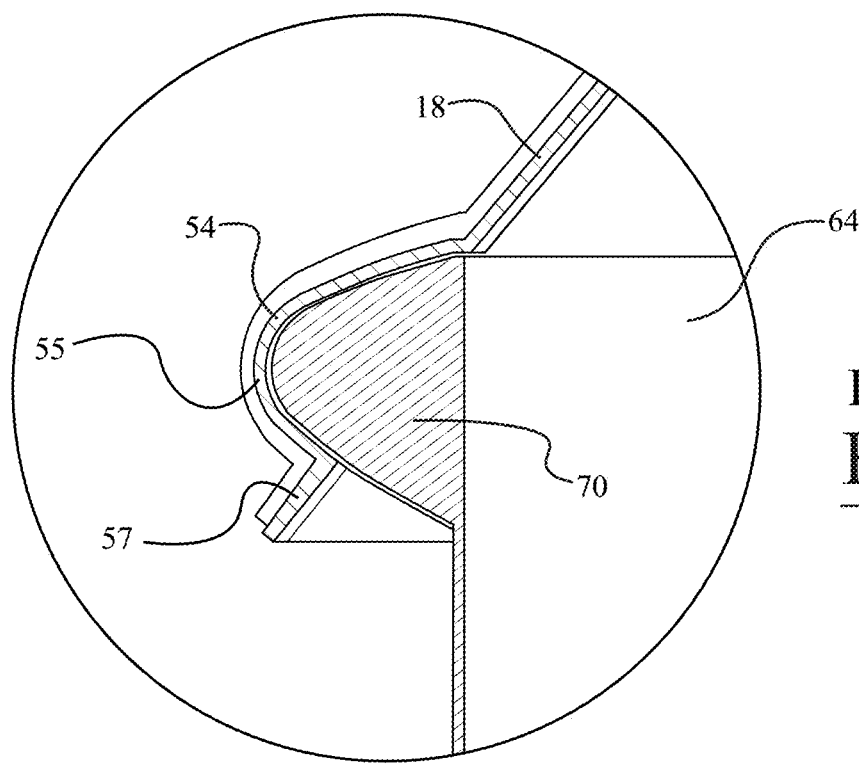
FIG. 13 is an enlarged cross-sectional view illustrating the engagement between the curved side rim of one of the boat cover sections of the hard shell boat cover depicted in FIG. 10 and the peripheral bumper of the boat (Detail "C")

Next, referring to FIGS. 8, 9, and 13 of the illustrative embodiment, the manner in which the plurality of boat cover sections 12, 14, 16, 18 are configured to engage with the top peripheral rim of the boat 64 will be described. In the illustrative embodiment, as shown in FIGS. 8, 9, and 13, the top peripheral edge of the boat 64 comprises a peripheral bumper 70. As shown in FIGS. 8 and 9, the first boat cover section 12 comprises a curved side rim 26 that engages with the peripheral bumper 70 of the boat 64, and the second boat cover section 14 comprises a curved side rim 42 that engages with the peripheral bumper 70 of the boat 64. Similarly, the third boat cover section 16 comprises a curved side rim 48 that engages with the peripheral bumper 70 of the boat 64, and the fourth boat cover section 18 comprises a curved side rim 54 that engages with the peripheral bumper 70 of the boat 64. In the illustrative embodiment, the curved side rims 26, 42, 48, 54 allow the hard shell boat cover 10 to snap onto the peripheral bumper 70. The engagement between the curved side rims 26, 42, 48, 54 of the boat cover sections 12, 14, 16, 18 and the peripheral bumper 70 at the top peripheral edge of the boat 64 enables the hard shell boat cover 10 to be securely engaged to the top of the boat 64 (refer to Detail "C" in FIG. 13). As shown in the illustrative embodiment of FIGS. 4, 5, 8, 9, and 13, the curved side rims 26, 42, 48, 54 of the boat cover sections 12, 14, 16, 18 each comprise a curved portion and an outwardly extending bottom lip portion attached to the curved portion. For example, as shown in Detail "C" of FIG. 13, the curved side rim 54 of the boat cover section comprises a curved portion 55 and an outwardly extending bottom lip portion 57. In FIG. 9, the engagement between the boat cover sections 12, 14, 16, 18 and the boat 64 is diagrammatically represented by the downwardly directed arrows 74.

Figure 4:
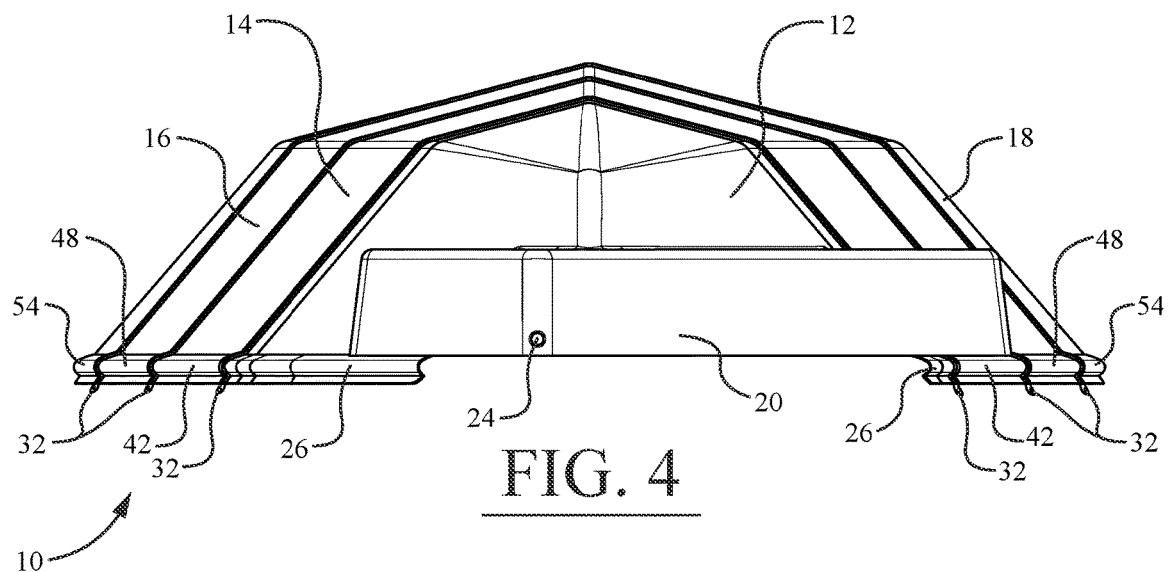
FIG. 4 is a front elevational view of the hard shell boat cover of FIG. 1.
Figure 5:
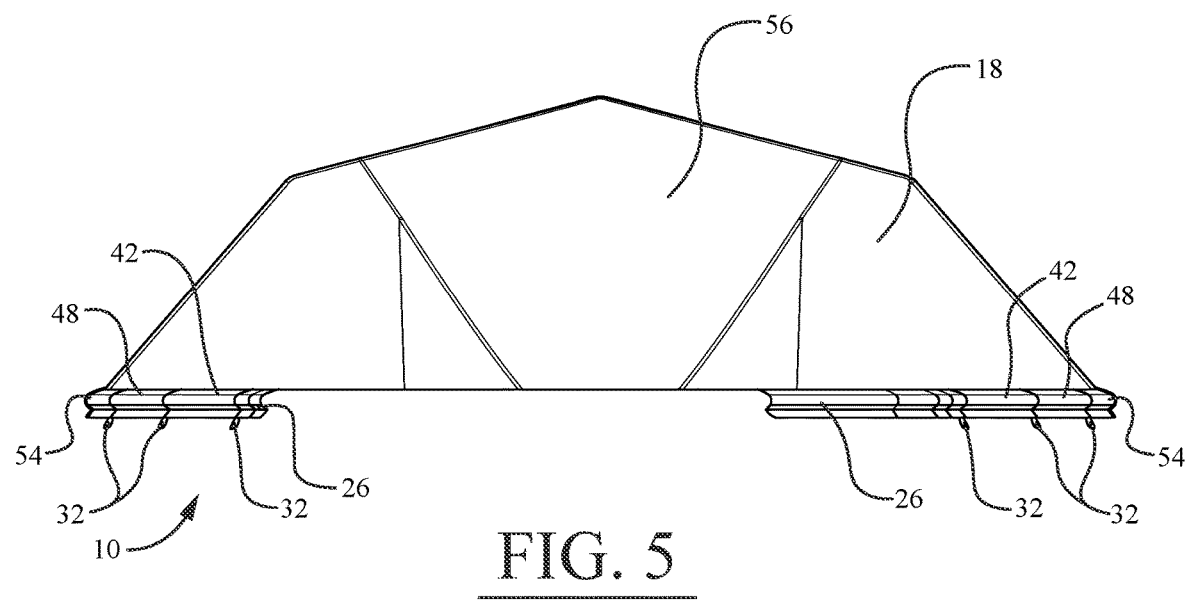
FIG. 5 is a rear elevational view of the hard shell boat cover of FIG. 1.
Figure 6:
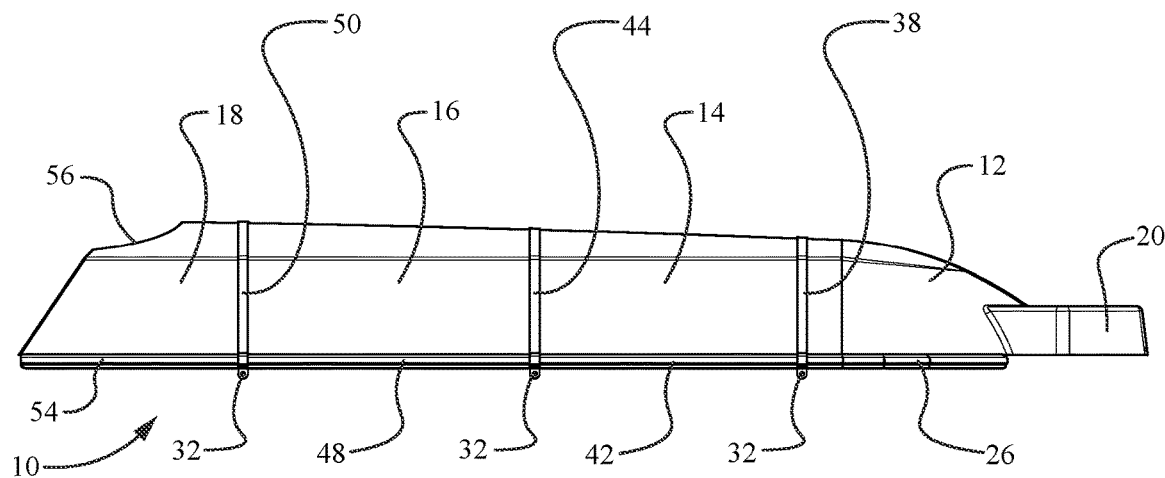
FIG. 6 is a first side elevational view of the hard shell boat cover of FIG. 1.
Figure 7:
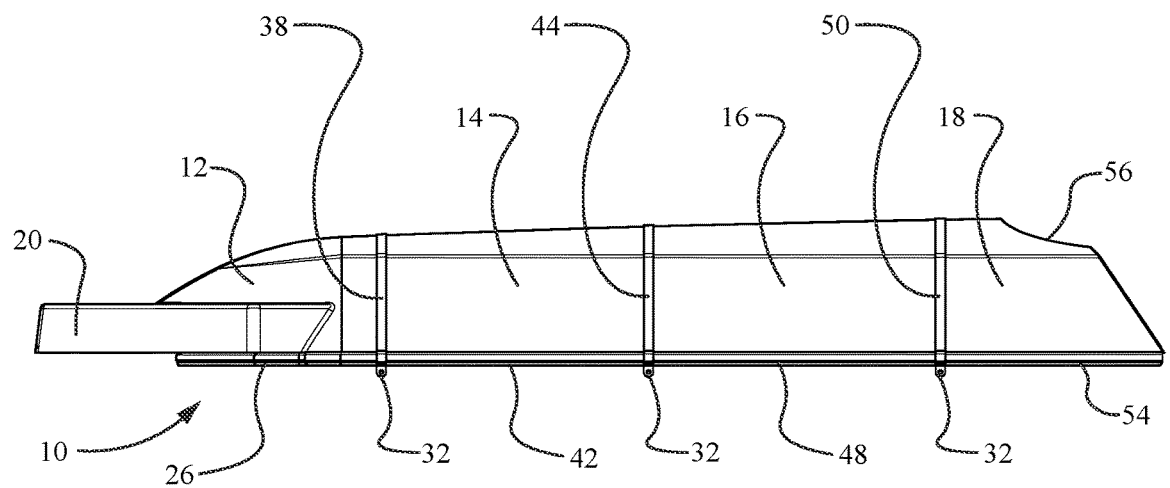
FIG. 7 is a second side elevational view of the hard shell boat cover of FIG. 1.
Figure 10:
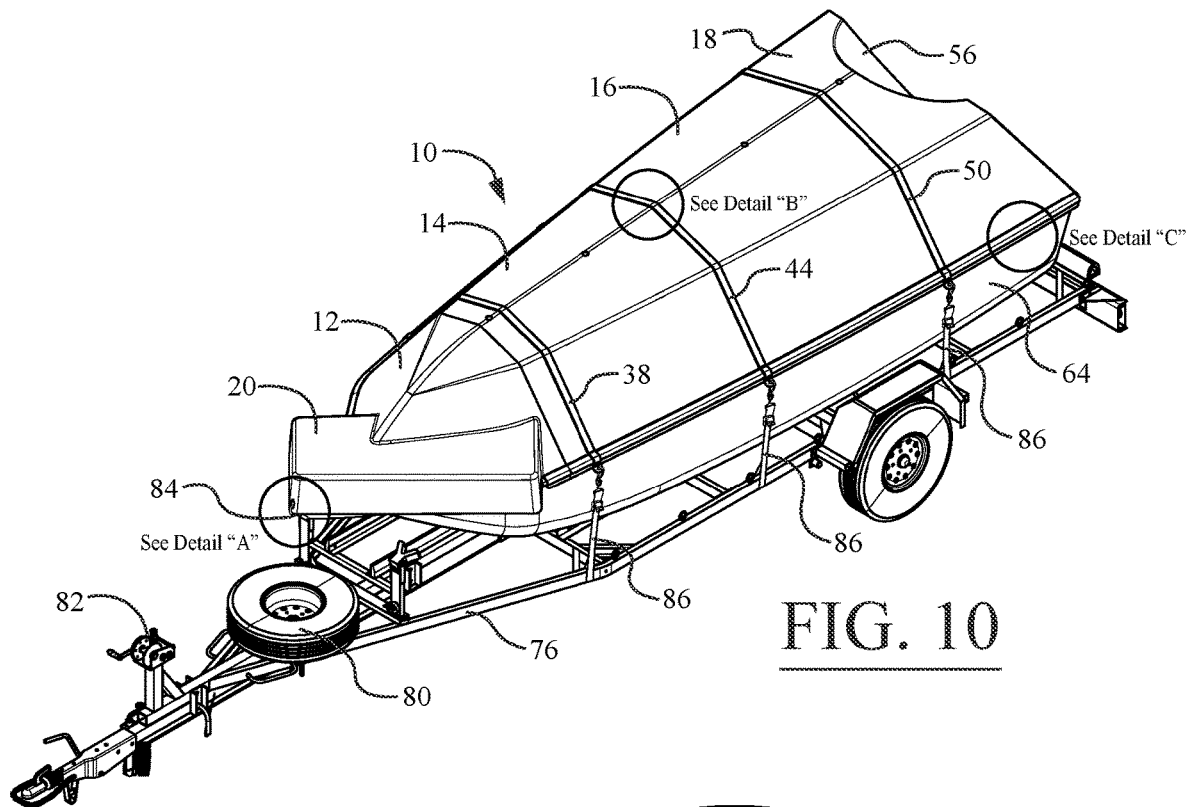
FIG. 10 is a perspective view of a boat on a trailer where the hard shell boat cover of FIG. 1 is shown secured to the top of the boat.
Figure 11:
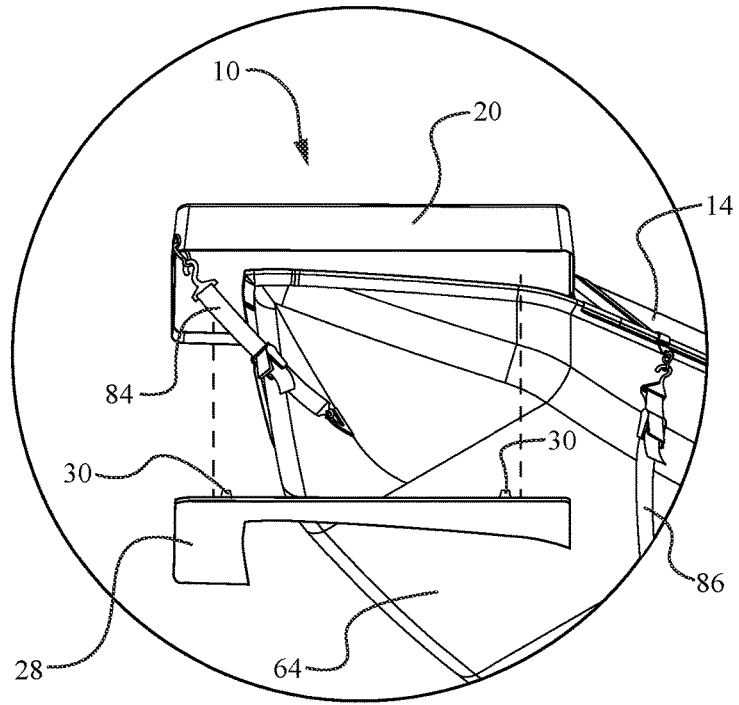
FIG. 11 is an enlarged perspective view illustrating the underside of the front portion of the hard shell boat cover depicted in FIG. 10, wherein the bottom cover panel of the trolling motor portion of the hard shell boat cover is shown removed from the remainder of the boat cover (Detail "A")

In the illustrative embodiment, as shown in FIGS. 1, 8, and 10, the hard shell boat cover 10 is provided with a plurality of securement elements 32 for securing the hard shell boat cover 10 to the top peripheral edge of the boat 64 once the curved side rims 26, 42, 48, 54 of the boat cover sections 12, 14, 16, 18 have been fitted on the peripheral bumper 70 of the boat 64. In the illustrative embodiment, each securement element 32 comprises a strap tie-down eyelet (see e.g., FIGS. 6 and 7), which includes an aperture for receiving a hook member of the securement strap 86 (see FIGS. 10 and 11). As shown in FIG. 10, the securement straps 86 secure the hard shell boat cover 10 to the trailer 76 so that the cover 10 does not become disengaged from the boat 64 during the transportation of the boat 64 from place to place. As best shown in FIGS. 4 and 5, each of the strap tie-down eyelets 32 is angled downward in the illustrative embodiment.

Figure 17:
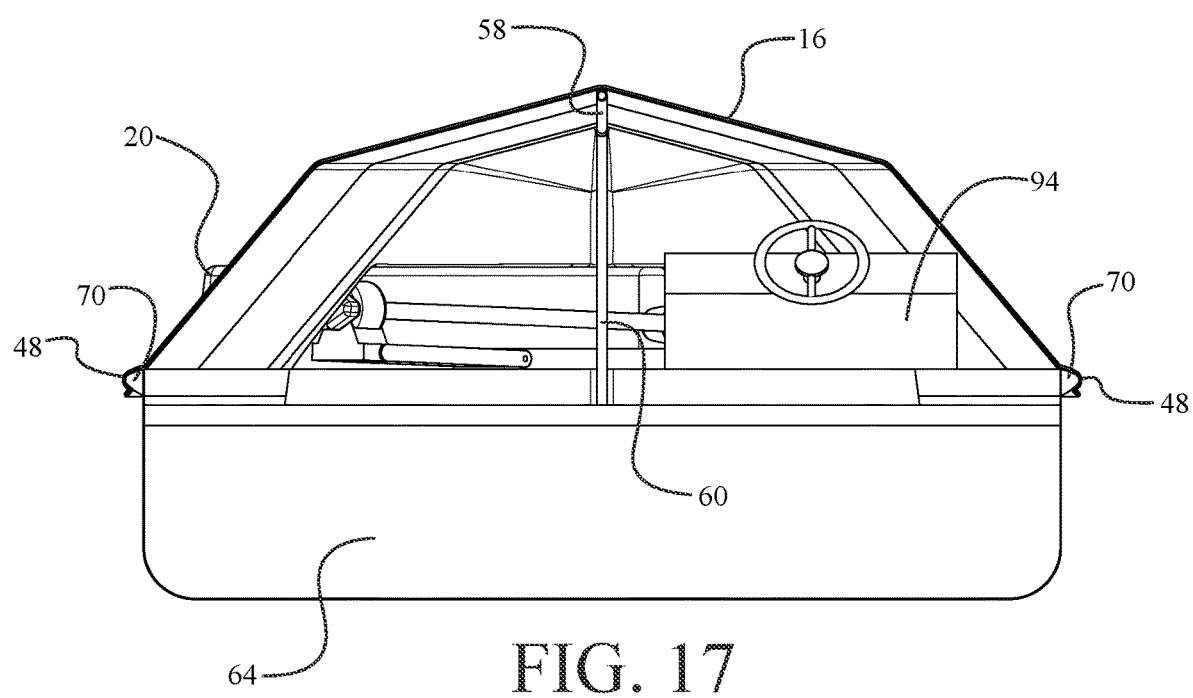
FIG. 17 is a transverse cross-sectional view of the hard shell boat cover of FIG. 1 disposed on the top of the boat where the inside of the boat cover is illustrated.

Turning now to the illustrative embodiment of FIGS. 8, 9, and 17, it can be seen that the hard shell boat cover 10 further comprises a support post assembly with a center horizontal support bar 58 and a pair of vertical support posts 60 for supporting a center portion of the hard shell boat cover 10. In the illustrative embodiment, the horizontal support bar 58 spans the pair of vertical support posts 60 so as to support the center portion of the hard shell boat cover 10 along the length thereof (i.e., the horizontal support bar 58 longitudinally spans multiple boat cover sections 12, 14, 16, 18). More specifically, referring collectively to FIGS. 8 and 9, each of the vertical support posts 60 comprises a top cradle 62 that receives a longitudinal section of the horizontal support bar 58 such that the support bar 58 is horizontally supported between the support posts 60. As shown in FIGS. 8 and 9, the floor of the boat 64 is provided with a pair of post holes 68 for supporting the bottom end portions of the vertical support posts 60.

In FIG. 17, it can be seen that the hard shell boat cover 10 has a height that is sufficient to accommodate the driver's console 94 of the boat 64. The center portion of the hard shell boat cover 10 is shown being supported by the horizontal support bar 58 and one of the vertical support posts 60 in FIG. 17.

Figure 14:
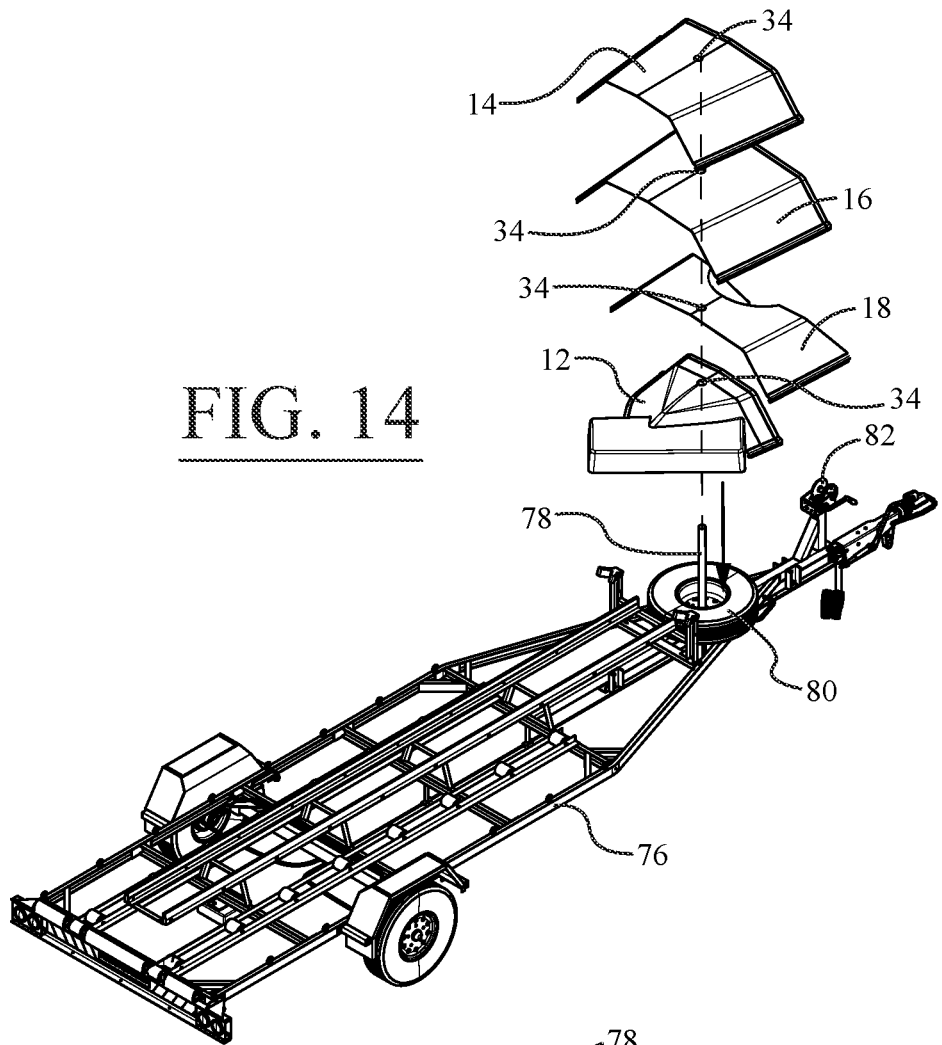
FIG. 14 is an exploded perspective view illustrating the manner in which the boat cover sections of the hard shell boat cover of FIG. 1 are able to be secured to a boat trailer.
Figure 15:
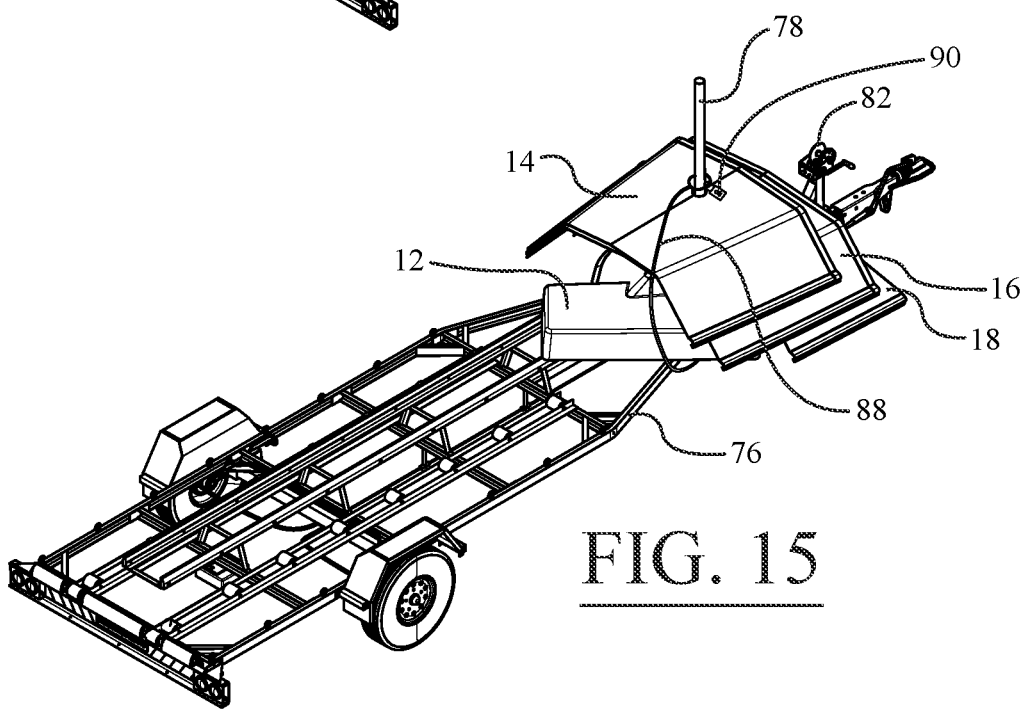
FIG. 15 is a perspective view illustrating the boat cover sections of the hard shell boat cover of FIG. 1 secured to a boat trailer when not in use on a boat.

In the illustrative embodiment, for convenient storage of the hard shell boat cover 10 when it is not in use, the plurality of boat cover sections 12, 14, 16, 18 are configured to be stacked on the boat trailer 76 of the boat 64 (refer to FIGS. 14 and 15). More specifically, in the illustrative embodiment, each of the plurality of boat cover sections 12, 14, 16, 18 comprises an aperture 34 formed therein for accommodating a post 78 on the boat trailer 76 so that the plurality of boat cover sections 12, 14, 16, 18 are able to be arranged in a stacked configuration on the post 78 (see FIG. 15). As shown in FIG. 14, the post 78 on which the boat cover sections 12, 14, 16, 18 are stacked is located in the center of the spare tire 80 on the trailer 76, just behind the winch 82 of the trailer 76. Referring to FIG. 15, it can be seen that, once the boat cover sections 12, 14, 16, 18 are stacked on the post 78 of the trailer 76, the boat cover sections 12, 14, 16, 18 are locked in place using a locking cable 88 and an associated padlock 90.

As shown in the illustrative embodiment of FIGS. 1 and 8, each of the plurality of boat cover sections 12, 14, 16, 18 comprises a plug 36 for sealing the respective section aperture 34 when the plurality of boat cover sections 12, 14, 16, 18 are being used to cover the boat 64 so that hard shell boat cover 10 is generally waterproof (i.e., the plugs 36 prevent water from getting in the cover 10). In the illustrative embodiment, each of the plugs 36 may comprise a suitable rubber or polymeric plug that snugly fits within the aperture 34.

It is readily apparent that the aforedescribed hard shell boat cover 10 offers numerous advantages. First, the hard shell boat cover 10 does not sag under the weight of rain, ice, or snow, and does not allow the precipitation to leak through the cover 10. Secondly, the hard shell boat cover 10 is aerodynamic so that the boat cover 10 does not flap in the wind or create excessive drag when the boat 64 is being towed. Thirdly, the hard shell boat cover 10 provides more protection for the boat 64 and the contents inside the boat by locking down on the top of the boat 64 (i.e., the securement straps 84, 86 secure the cover 10 to the peripheral bumper 70 or gunnel rail of the boat 64). Finally, the hard shell boat cover 10 offers protection from flying objects hitting the boat 64, and damaging the contents inside the boat 64.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A hard shell boat cover, comprising:
   a plurality of boat cover sections, the plurality of boat cover sections configured to interlock with one another so as to form the hard shell boat cover, and one or more of the plurality of boat cover sections configured to engage with a top peripheral edge of a boat; and
   at least one securement element attached to one of the plurality of boat cover sections, the securement element configured to be coupled to a securement strap for securing the hard shell boat cover to the top peripheral edge of the boat;
   wherein one of the plurality of boat cover sections comprises a notched portion for accommodating a main motor of the boat, the notched portion including a sloped cover wall portion that extends partially around an upper portion of the main motor; and
   wherein another one of the plurality of boat cover sections comprises a formed enclosure for accommodating a trolling motor of the boat, the formed enclosure protruding outwardly beyond a curved side rim of the another one of the plurality of boat cover sections.

2. The hard shell boat cover according to claim 1, wherein each of the plurality of boat cover sections is made from a generally rigid polymeric material or plastic.

3. The hard shell boat cover according to claim 1, wherein the top peripheral edge of the boat comprises a peripheral bumper, and wherein the curved side rim of the another one of the plurality of boat cover sections is configured to engage with the peripheral bumper at the top peripheral edge of the boat.

4. The hard shell boat cover according to claim 1, wherein the at least one securement element comprises a strap tie-down eyelet, the strap tie-down eyelet including an aperture for receiving a hook member of the securement strap.

5. The hard shell boat cover according to claim 1, wherein at least a first one of the plurality of boat cover sections comprises one or more notches proximate to a front edge or rear edge of the first one of the plurality of boat cover sections, at least a second one of the plurality of boat cover sections comprises one or more protruding ridges configured to engage with the one or more notches of the first one of the plurality of boat cover sections so that the first and second ones of the plurality of boat cover sections are able to interlock with one another.

6. The hard shell boat cover according to claim 1, further comprising at least one vertical support post for supporting a center portion of the hard shell boat cover.

7. The hard shell boat cover according to claim 6, wherein the at least one vertical support post comprises a plurality of vertical support posts, and wherein the hard shell boat cover further comprises a horizontal support bar spanning the plurality of vertical support posts, the horizontal support bar supporting the center portion of the hard shell boat cover.

8. The hard shell boat cover according to claim 1, wherein the plurality of boat cover sections are configured to be stacked on a boat trailer when the plurality of boat cover sections are not being used on the boat.

9. The hard shell boat cover according to claim 1, wherein the top peripheral edge of the boat comprises a peripheral bumper, and wherein the curved side rim of the another one of the plurality of boat cover sections is configured to engage with the peripheral bumper at the top peripheral edge of the boat, the curved side rim of the another one of the plurality of boat cover sections comprising a curved portion and an outwardly extending bottom lip portion attached to the curved portion, the curved side rim enabling the another one of the plurality of boat cover sections to snap onto the peripheral bumper so that the hard shell boat cover is securely engaged to the top peripheral edge of the boat.

10. The hard shell boat cover according to claim 1, further comprising a bottom cover panel configured to engage with a bottom edge of the formed enclosure so as to cover an underside of the trolling motor.

11. A hard shell boat cover, comprising:
    a plurality of boat cover sections, the plurality of boat cover sections configured to interlock with one another so as to form the hard shell boat cover, and one or more of the plurality of boat cover sections configured to engage with a top peripheral edge of a boat; and
    at least one securement element attached to one of the plurality of boat cover sections, the securement element configured to be coupled to a securement strap for securing the hard shell boat cover to the top peripheral edge of the boat;
    wherein the top peripheral edge of the boat comprises a peripheral bumper, and wherein at least one of the plurality of boat cover sections comprises a curved side rim for engaging with the peripheral bumper at the top peripheral edge of the boat, the curved side rim of the at least one of the plurality of boat cover sections comprising a curved portion and an outwardly extending bottom lip portion attached to the curved portion, the curved side rim enabling the at least one of the plurality of boat cover sections to snap onto the peripheral bumper so that the hard shell boat cover is securely engaged to the top peripheral edge of the boat.

12. The hard shell boat cover according to claim 11, wherein at least one of the plurality of boat cover sections comprises a formed enclosure for accommodating a trolling motor on the boat, the formed enclosure protruding from a curved body portion of the at least one of the plurality of boat cover sections, and the formed enclosure being rectangular in shape for housing the trolling motor.

13. The hard shell boat cover according to claim 11, wherein the at least one securement element comprises a strap tie-down eyelet, the strap tie-down eyelet including an aperture for receiving a hook member of the securement strap, and the strap tie-down eyelet extending diagonally downward from the outwardly extending bottom lip portion of the curved side rim of the at least one of the plurality of boat cover sections.

14. The hard shell boat cover according to claim 11, wherein at least a first one of the plurality of boat cover sections comprises an overlapping offset edge portion that includes one or more notched areas proximate to a front edge or rear edge of the first one of the plurality of boat cover sections, at least a second one of the plurality of boat cover sections comprises a ridged edge portion that includes one or more protruding ridges configured to engage with the one or more notched areas of the overlapping offset edge portion of the first one of the plurality of boat cover sections so that the first and second ones of the plurality of boat cover sections are able to interlock with one another, the overlapping offset edge portion of the first one of the plurality of boat cover sections extending over a top surface of the ridged edge portion of the second one of the plurality of boat cover sections.

* * * * *